(12) United States Patent
Ault et al.

(10) Patent No.: US 8,683,720 B2
(45) Date of Patent: Apr. 1, 2014

(54) HYDRAULIC SUSPENSION HITCH SYSTEM

(75) Inventors: David E. Ault, Peoria, IL (US); Jeffrey L. Kuehn, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 396 days.

(21) Appl. No.: 13/169,369

(22) Filed: Jun. 27, 2011

(65) Prior Publication Data

US 2012/0324767 A1     Dec. 27, 2012

(51) Int. Cl.
*E02F 3/65*     (2006.01)
*E02F 9/02*     (2006.01)

(52) U.S. Cl.
USPC .............................. 37/414; 91/461; 280/489

(58) Field of Classification Search
USPC .............. 37/413–417, 422, 431; 91/461, 518, 91/526, 536, 459, 466; 137/624.27, 137/625.65, 625.69; 172/444, 684.5; 180/14.1; 267/64.16, 273; 280/421, 280/489, 483, 492, 455.1, 504, 124.162, 280/124.166
See application file for complete search history.

(56) References Cited

U.S. PATENT DOCUMENTS

| | | | |
|---|---|---|---|
| 3,311,389 A | | 6/1965 | Barton et al. |
| 3,430,657 A | | 12/1966 | Junck et al. |
| 3,680,892 A | | 8/1972 | Olthoff et al. |
| 3,797,140 A | * | 3/1974 | McWilliams et al. .......... 37/414 |
| 3,980,321 A | | 9/1976 | Hamilton |
| 4,149,606 A | * | 4/1979 | Hawk ........................... 180/14.1 |
| RE30,128 E | * | 10/1979 | Ohms ............................ 37/416 |
| 4,449,733 A | * | 5/1984 | Iida et al. ....................... 37/413 |
| 4,982,979 A | | 1/1991 | Akatsu |
| 5,562,305 A | | 10/1996 | Heyring |

\* cited by examiner

*Primary Examiner* — Robert Pezzuto
(74) *Attorney, Agent, or Firm* — Bart A. Fisher

(57) ABSTRACT

The present disclosure provides a hitch suspension system that reduces a transfer of energy (e.g., provides a smoother ride) between two bodies hitched together, such as between a towing vehicle and a towed vehicle/trailer. In an embodiment, the suspension system includes a hydraulic cylinder with an extendable rod in fluid communication with a fluid pump. A control valve is fluidly coupled between the hydraulic cylinder and the fluid pump and is configured to adjust an extension length of the rod. Additionally, a variable orifice that adjusts resistance to extension and retraction of the rod is fluidly coupled between the hydraulic cylinder and the control valve. A first fixed restrictive element is fluidly coupled in series with the variable orifice to dissipate energy ad the rod extends and a second fixed restrictive element is fluidly coupled in series with the variable orifice to dissipate energy as the rod retracts.

6 Claims, 3 Drawing Sheets

HYDRAULIC SUSPENSION HITCH SYSTEM

TECHNICAL FIELD

The present disclosure relates generally to a hydraulic suspension hitch system. In an embodiment, the present disclosure relates specifically to a hydraulic suspension hitch system for a work machine, such as a wheel tractor-scraper machine.

BACKGROUND

A wheel tractor-scraper is a machine employed in various industries, such as agriculture, construction and mining to load, haul, eject and spread layers of earth. Such machines are particularly suited for applications such as roadway construction and site preparation, where material needs to be removed or added while creating or maintaining grade and hauling occurs over a distance. Conventional wheel tractor-scrapers typically include a tractor portion having a forward frame member that supports an operator station and a propulsion power source operatively coupled to the drive wheels of the machine. An articulated joint couples the tractor portion to the rear scraper portion of the machine. The scraper portion has a rear frame member that supports both a bowl for collecting and hauling material, and the rear wheels. During operation, the bowl is typically lowered to engage the ground along a cutting edge that is driven forward by the machine, thus, scraping the earth and loading the bowl. These machines may have an earth-moving work tool, such as an elevator, conveyor, auger, or spade, associated with the bowl to facilitate penetration, loading, and/or unloading of the material to be transported.

One problem with wheel tractor-scrapers is that the articulated joint that couples the tractor portion to the rear scraper portion of the machine may transfer a great deal of pitch and bounce causing shock and vibration to propagate through the machine to the operator when the machine contacts bumps and/or holes along a driving path.

The disclosure of U.S. Pat. No. 3,311,389 provides a system for control of pitch and bounce in tractor-trailer machines. Thus, in the '389 patent a tractor-trailer hitch is shown in which vertical motion is permitted, but limited and cushioned by a hydraulic cylinder connected between the units and associated with gas over oil accumulators and a fixed restrictive element (e.g., a fixed fluid orifice) to provide the desired spring rate. Given that this system is to reduce shock and vibration, it is desired to keep the hydraulic cylinder's rod situated near a centered extension point during travel time so that it may extend or retract as the wheels of the scraper portion engage bumps or holes in the driving path. To slow movement of the cylinder rod so that it is less likely to "top out" or "bottom out" when bumps or holes in the driving path are engaged, a fixed restriction is provided in the fluid line, thus slowing flow of fluid to or from the cylinder. Shortcomings of the '389 patent were improved upon by U.S. Pat. No. 3,430,657, which provides a balancing of gravitational forces in a vertically disposed valve spool.

However, these references both only provide a fixed restrictive element, which may have only one ideal loading weight to minimize vibration and shock propagated through the machine. Thus, it is desirable to provide a system that improves upon these and other shortcomings of an articulated hitch system, as discussed above, and allows for tuned vibration damping at multiple loading levels of the machine.

SUMMARY OF THE INVENTION

In one aspect, the present disclosure provides a suspension system. In an embodiment, the suspension system includes a hydraulic cylinder having an extendable rod. The hydraulic cylinder is fluidly coupled to a fluid pump. The suspension system also includes a control valve fluidly coupled between the hydraulic cylinder and the fluid pump. The control valve adjusts an extension length of the rod. In addition, the suspension system includes a variable orifice fluidly coupled between the hydraulic cylinder and the control valve. The variable orifice is configured to adjust resistance to extension and retraction of the rod. Furthermore, the suspension system includes a first fixed restrictive element fluidly coupled in series with the variable orifice to dissipate energy as the rod extends, and a second fixed restrictive element fluidly coupled in series with the variable orifice to dissipate energy as the rod retracts.

In another aspect, the present disclosure provides a cushion hitch that couples a towed vehicle to a drive vehicle. In an embodiment, the hitch includes a linkage system having first and second pivotable links configured to couple a towed vehicle to a drive vehicle. The hitch also includes a suspension system coupled to the linkage system. The suspension system is configured to adjust the ride height of the towed vehicle with respect to the drive vehicle. In an embodiment, the suspension system includes a hydraulic cylinder with an extendable rod. The hydraulic cylinder and the rod are coupled between the first and second pivotable links. A control valve is fluidly coupled between the hydraulic cylinder and the fluid pump. The control valve is configured to adjust an extension length of the rod. A variable orifice is fluidly coupled between the hydraulic cylinder and the control valve and is configured to adjust resistance to extension and retraction of the rod. A first fixed restrictive element is fluidly coupled in series with the variable orifice to dissipate energy as the rod extends and a second fixed restrictive element is fluidly coupled in series with the variable orifice to dissipate energy as the rod retracts.

In a further aspect, the present disclosure provides a tractor-scraper machine. The tractor-scraper machine includes a tractor drive vehicle having a propulsion system and a hydraulic fluid pump. The tractor-scraper also includes a towed scraper. Furthermore, the tractor-scraper includes a cushion hitch that couples the towed scraper to the tractor drive vehicle. In an embodiment, the cushion hitch includes first and second pivotable links coupled between the towed scraper and the tractor drive vehicle. A suspension system is coupled to the cushion hitch. The suspension system includes a hydraulic cylinder with an extendable rod. The hydraulic cylinder and the rod are coupled between the first and second pivotable links. A control valve is fluidly coupled between the hydraulic cylinder and the fluid pump. The control valve is configured to adjust an extension length of the rod. A variable orifice is fluidly coupled between the hydraulic cylinder and the control valve and is configured to adjust resistance to extension and retraction of the rod. A first fixed restrictive element is fluidly coupled in series with the variable orifice to dissipate energy as the rod extends, and a second fixed restrictive element is fluidly coupled in series with the variable orifice to dissipate energy as the rod retracts.

DETAILED DESCRIPTION

The present disclosure relates generally to a hydraulic suspension hitch system. In an embodiment, the present disclosure relates specifically to a hydraulic suspension hitch system for a work machine, such as a wheel tractor-scraper machine.

Figure 1:
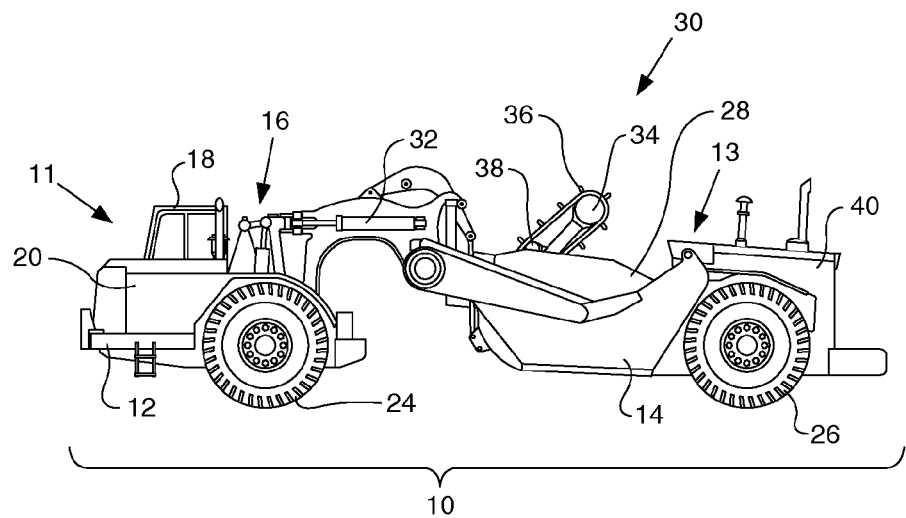
FIG. 1 illustrates a side view of an embodiment of a work machine, illustrated here as a tractor-scraper, having a cushion hitch hydraulic suspension system.

FIG. 1 illustrates an elevating wheel tractor-scraper 10 having a tractor portion 11 (e.g., a drive vehicle), with a front frame section 12, and a scraper portion 13 (e.g., a towed vehicle), with a rear frame section 14, that are pivotally coupled through an articulation hitch 16. Steering may be provided by one or more steering cylinders 32 (actuators) (one shown) mounted between the tractor portion 11 and scraper portion 13 on opposing sides of the scraper 10.

The front frame section 12 supports a power source 20 and a cooling system (not shown). The power source 20 is operatively connected through a transmission (not shown) to become a propulsion system to drive front wheels 24 located on opposite sides of scraper 10 for primary propulsion of the scraper 10. The front frame section 12 may also support an operator station 18 for primary control of the scraper 10 during operations of the scraper 10.

The rear frame section 14 supports a bowl 28 and rear wheels 26. The bowl 28 may also include a work tool 30, such as an elevator 34. In another embodiment, the bowl 28 may include an auger, a conveyor, and/or a spade, to facilitate penetration, loading, and/or unloading of the material to be transported by scraper 10.

Power source 20 is a propulsion system that may include an engine such as a diesel engine, a gasoline engine, a gaseous fuel powered engine such as a natural gas engine, or any other type of engine. Power source 20 may alternatively include a non-combustion source of power such as a fuel cell, a power storage device, an electric motor, or other similar mechanism.

To propel the scraper 10, power source 20 may be operatively coupled with front wheels 24 using a transmission (not shown), torque converter (not shown), gear box (not shown), transfer case (not shown), differential (not shown), drive shaft (not shown), reduction gear arrangement, and/or any other devices configured to transmit power from power source 20 to the wheels 24.

In an alternative embodiment, scraper 10 may include an electric or hydraulic drive (not shown). For example, power source 20 may be operatively connected to a pump (not shown), such as a variable or fixed displacement hydraulic pump. The pump may produce a stream of pressurized fluid directed to one or more motors (not shown) associated with wheels 24 for the primary means of propulsion. Alternatively, power source 20 may be drivably connected to an alternator or generator (not shown) configured to produce an electrical current used to power one or more electric motors (not shown) for driving the front wheels 24.

In addition to driving the front wheels 24, power source 20 may be configured to supply power to a work tool 30 employed by the scraper 10 to penetrate and/or transfer material into or out of bowl 28, or to perform other operations. For example, in one embodiment, a transmission (not shown) is connected to a fluid pump (not shown). The pump may be fluidly connected through one or more supply and/or return lines (not shown) to supply a flow of pressurized fluid to a hydraulic motor (not shown), which is in turn operatively connected to power work tool 30. In one embodiment, work tool 30 is an elevator 34. Elevator 34 generally includes a series of parallel, horizontally disposed flights 36 connected to a drive chain 38. The drive chain 38 is operatively connected to rotational sprockets, an elevator drive shaft, and/or an elevator motor.

Throughout the specification, use of the terms supply and return in the alternative, or shown as "supply/return" should be understood to refer to the fact that the system may include a reversible pump that may be employed to change the direction of flow within particular conduits, in one direction acting as a supply, and in the other acting as a return line.

Wheel tractor-scrapers may be employed in push-pull operations, wherein a first tractor scraper is either pulled or pushed by a second machine, for example, a track-type dozer or another wheel tractor-scraper, during the loading process. Wheel tractor-scrapers are often provided with hitches or push bars to facilitate these operations. Some large wheel tractor-scrapers are provided with an additional, rear mounted engine 40 or other secondary propulsion power source system operatively connected to drive the rear wheels 26 of the machine 10 (e.g., twin-engine scrapers), making these machines better suited for handling adverse terrain and worksite conditions. Other alternatives provide a fluid operated rear wheel drive assist system on the machines.

Figure 2:
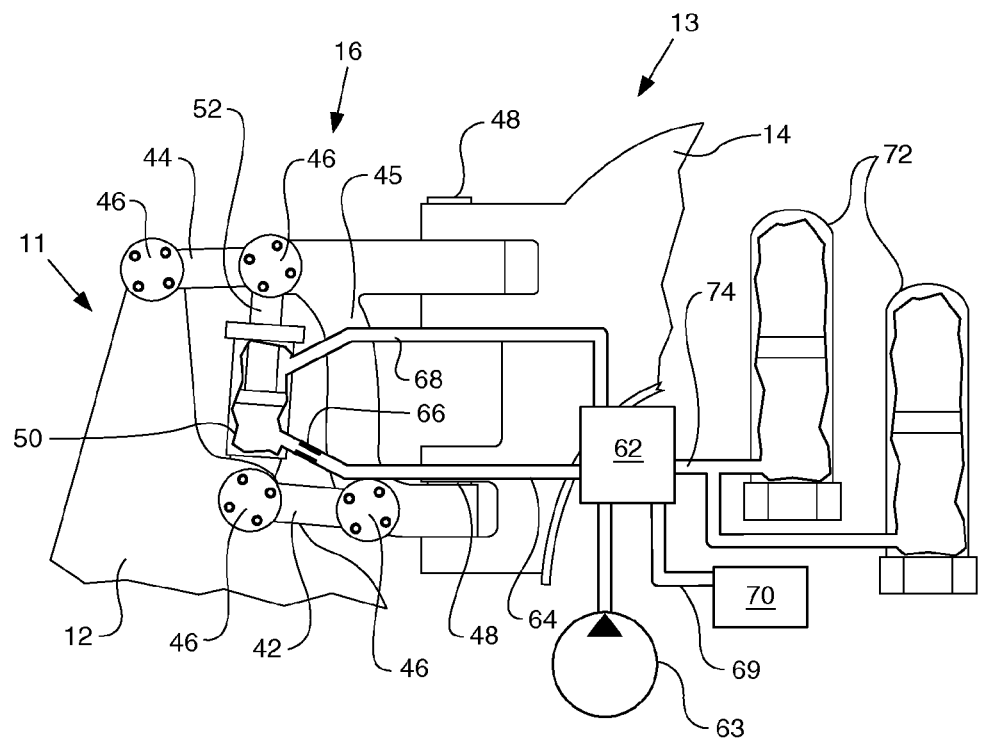
FIG. 2 illustrates an enlarged portion of the work machine of FIG. 1, showing an embodiment of the cushion hitch hydraulic suspension system in schematic form.
Figure 3:
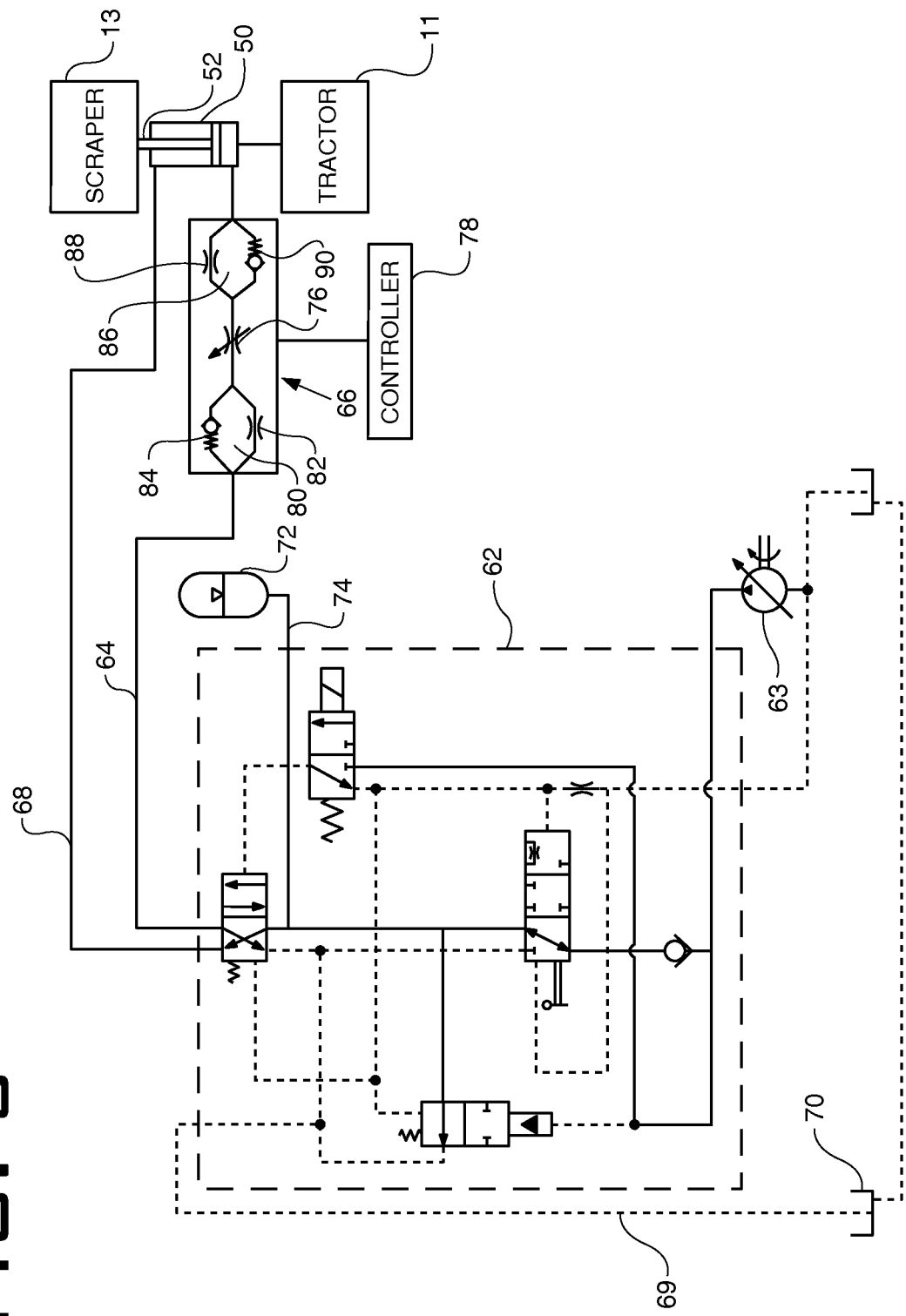
FIG. 3 illustrates a schematic diagram of an embodiment of a fluid circuit for the cushion hydraulic suspension system of FIG. 2.

FIG. 2 illustrates an enlarged portion of an embodiment of the work machine (scraper 10) of FIG. 1, showing an embodiment of the articulation cushion hitch hydraulic suspension system 16 in schematic form. FIG. 3 illustrates a schematic diagram of an embodiment of a fluid circuit for the cushion hydraulic suspension system of FIG. 2. Front frame section 12 of tractor 11 is coupled to rear frame section 14 of scraper 13 via first 42 and second 44 pivotable links. In an embodiment, the hitch 16 includes a vertical link 45 coupling first 42 and second 44 pivotable links to rear frame section 14 using one or more vertical pivot pins 48.

First 42 and second 44 pivotable links are formed of a rigid material, such as steel, iron, or other high tensile strength metallic material. In the alternative, it is contemplated that first 42 and second 44 pivotable links may be formed of a composite material, such as carbon graphite, Kevlar, or other high strength materials. First 42 and second 44 pivotable links couple front frame section 12 with rear frame section 14 at hitch pivot 46 locations. Pivot 46 locations may include a pin (not shown) or other holding device that passes through openings (not shown) in links 42, 44 and also through openings (not shown) in frame sections 12, 14. First 42 and second 44 pivotable links may be situated in non-parallel planes, thus substantially creating a trapezoidal shape with first 42 and second 44 pivotable links, front frame section 12 and vertical link 45. As should be readily understood, such a configuration of the hitch 16 allows for a pivoting motion along multiple planes and axis between tractor 11 and scraper 13.

A hydraulic cylinder assembly 50, having an extendable rod 52, is disposed between and coupled to first 42 and second 44 pivotable links. As shown in FIG. 2, an embodiment provides that hydraulic cylinder assembly 50 has a body portion that couples with a forward or tractor portion pivot 46 and the extendable rod 52 couples with a rearward or scraper portion pivot 46. However, it should be understood that the orientation of hydraulic cylinder assembly 50 may be inverted and/or switched to the other of the pivots 46 so long as first 42 and second 44 pivotable links are configured to pivot between the tractor 11 and the scraper 13. As extendable rod 52 extends, a ride height of scraper 13 is raised. Conversely, as extendable rod 52 retracts, the ride height of scraper 13 is lowered due to pivoting of first 42 and second 44 pivotable links at pivots 46.

Extension/retraction of extendable rod 52 is provided via a pressurized fluid (e.g., a hydraulic fluid) being controlled by a control valve 62. To extend extendable rod 52 of hydraulic cylinder assembly 50, control valve 62 receives pressurized fluid from a fluid pump 63 that is powered by power source 20 or by some other power source. Fluid pump 63 passes the pressurized fluid through a fluid line 64, a variable orifice assembly 66, hydraulic cylinder assembly 50, fluid lines 68 and 69, and then to a fluid tank return/holding tank 70. As should be understood, the fluid system (e.g., a hydraulic fluid system) is generally a closed loop fluid system where the operable fluid is pressurized to perform a work function and then is returned to be used again. As will be explained in more detail below, variable orifice assembly 66 is a system that influences a speed at which extendable rod 52 extends and contracts.

To retract extendable rod 52, control valve 62 essentially reverses flow of the pressurized fluid through hydraulic cylinder assembly 50. One embodiment and one state of operation for control valve 62 is shown in a schematic view provided in FIG. 3 having a variety of fluid valves and fluid lines. Other embodiments of control valve 62 may also be used with the present disclosure. However, for sake of brevity, control valve 62 is described for one embodiment with the schematic diagram of FIG. 3, which should be readily understood by those having ordinary skill in the art, and is not explained further.

Control valve 62 may lock extendable rod 52 into a fully retracted location, a fully extended location, and/or at any location in between. For example, when filling bowl 28, extendable rod 52 may be locked fully retracted, thus lowering bowl 28 and work tool 30. In addition, control valve 62 may position extendable rod 52 at a given extension length or ride height and yet also allow the extendable rod 52 to "float" (e.g., retract and extend) as wheels 24, 26 engage bumps and/or holes in a driving path, which in turn, causes first 42 and second 44 pivotable links to pivot at pivot points 46. While driving wheel tractor scraper 10 it may be desirable to loosely hold extendable rod 52 in a somewhat middle location to absorb shock provided by bumps and holes along the driving path.

One or more accumulators 72 are fluidly coupled with the control valve 62 via a fluid line 74. Accumulator 72 is a fluid tank having a free-floating piston, bladder, or other device that divides accumulator 72 into different chambers. One chamber is for the pressurized fluid and one chamber is for a compressible gas (e.g., nitrogen). Accumulator 72 receives the pressurized fluid in the fluid chamber, which displaces the piston or bladder, thus compressing the gas in the gas chamber. Accordingly, accumulator 72 provides compliance to the pressurized fluid. For example, if the wheel tractor scraper 10 hits a bump or hole while driving, extendable rod 52 is likely to be forced to extend or retract very quickly as shock of the bump or hole is transferred between tractor 11 and scraper 13. This passes the pressurized fluid through control valve 62 and to or from accumulator 72. Thus, accumulator 72 absorbs a significant amount of this shock/energy rather than passing it between tractor 11 and scraper 13, as would happen if articulation hitch 16 was rigid.

Turning again to FIG. 3, the disclosure provides an embodiment of a variable orifice assembly 66. In an embodiment, variable orifice assembly 66 includes a variable orifice 76. A controller 78 provides operation signals such as electrical, pressurized fluid, or other communication signals to variable orifice 76. The operation signals cause the variable orifice 76 to increase and/or decrease a size of a fluid passageway through variable orifice 76. This changing of size of the fluid passageway influences or otherwise controls a resistance to the pressurized fluid flowing through the variable orifice 76. This, in turn, influences or otherwise controls the damping or energy dissipated by the extension and retraction of extendable rod 52 of hydraulic cylinder assembly 50. Accordingly, an extension and retraction rate for extendable rod 55 can be tuned to provide an optimized hitch rigidity and an optimized machine efficiency, (e.g., more rigid hitch), an optimized operator ride comfort (e.g., less rigid hitch), or anywhere in between.

If, variable orifice 76 does not respond to control signals from controller 78 or otherwise fails to operate or is not active, the fluid opening may float anywhere along an operating range for the variable orifice. Accordingly, this situation would not provide the tuned operation for articulation hitch 16. Thus, first 80 and second 86 choke/check valves are fluidly coupled in series with variable orifice 76. First choke/check valve 80 includes a first fixed orifice 82 and a first check valve 84 in parallel with one another, and in series with variable orifice 76. Similarly, second choke/check valve 86 includes a second fixed orifice 88 and a second check valve 90 in parallel with one another, and in series with variable orifice 76. First check valve 84 and second check valve 90 may be biased check valves requiring fluid to reach a pre-determined pressure to open the valve and pass through.

In an embodiment, variable orifice assembly 66 is configured to receive variable orifice 76, first check valve 84, second check valve 90, and has first 82 and second 88 fixed orifices formed in a block manifold. However, components of variable orifice assembly 66 may also be formed using individual components fluidly coupled together.

INDUSTRIAL APPLICABILITY

The present disclosure provides wheel tractor-scraper 10 that includes an articulation hitch 16. In operation, the scraper 10 loads, hauls, and ejects earth, thus efficiently moving loads of earth from one location to another location. Articulation hitch 16 is configured as a cushion hitch, which greatly reduces shock and vibration felt by an operator of scraper 10. Hydraulic cylinder assembly 50 (including extendable rod 52) and pivotable links 42, 44 enable articulation hitch 16 to adjust a height of scraper 13 relative to tractor 11 and also to absorb energy transfer between tractor 11 and scraper 13 as control valve 62 permits extendable rod 52 to extend and retract, thus causing pivotable links 42 and 44 to pivot about pivot points 46. Control valve 62 may be employed to keep extendable rod 52 at a somewhat middle extension length during driving times to provide hydraulic cushion suspension for hitch 16.

Variable orifice 76 provides a tuned operation for extension and retraction speeds of extendible rod 52 as instructed by controller 78. Controller 78 may employ variable orifice 76 to provide different damping rates for different operations of wheel tractor scraper 10. For example, when loading or unloading bowl 28, variable orifice 76 may be smaller, causing articulation hitch 16 to be more rigid. Conversely, when driving wheel tractor scraper 10, variable orifice 76 may be larger, causing articulation hitch 16 to be less rigid, and thus providing a smoother ride for the operator.

Figure 4:
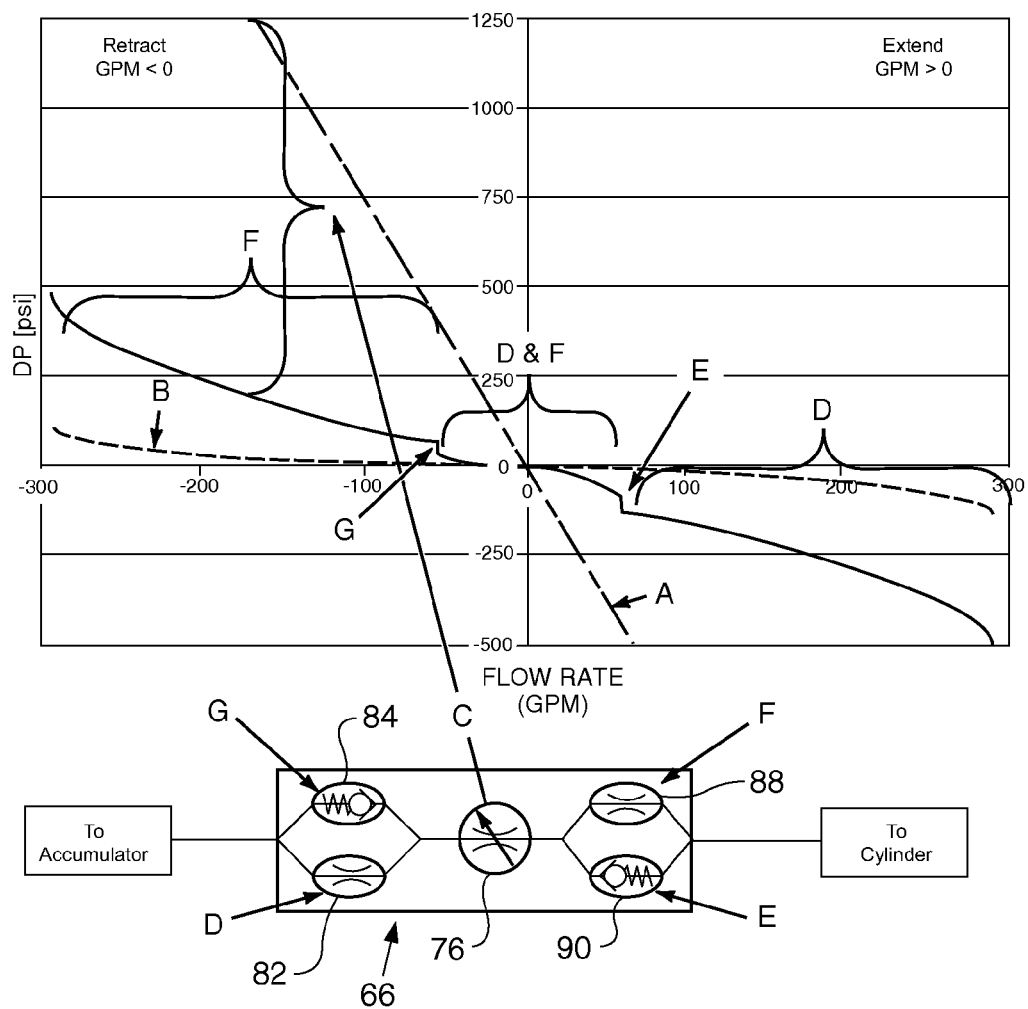
FIG. 4 illustrates a graph of an operating range for fluid flow rate vs. pressure drop for an embodiment of the fluid circuit of FIG. 3.

However, in the event that variable orifice 76 does not respond to instructions from controller 78, first 80 and second 86 choke/check valves provide fixed tuning for extension and retraction speeds for extendable rod 52. Specifically, if variable orifice 76 is not active or is not operational, fluid pressure at variable orifice assembly 66 may force variable orifice 76 to be at a fully open (e.g., least restrictive) state and may consequently allow a fluid flow rate through variable orifice assembly 66 that is larger than desired. Thus, in an embodiment, first 82 and second 88 fixed orifices provide a flow rate that is lower (e.g., more restrictive) than the non-active flow rate of variable orifice 76. Flow rates of first 82 and second 88 fixed orifices may differ from one another. This may be explained by following flow of fluid through variable orifice assembly 66. In addition, FIG. 4 illustrates a graph of an operating range for fluid flow rate vs. pressure drop (DP) for an embodiment of the fluid circuit of FIG. 3. In FIG. 4, line A represents the maximum flow rate vs. pressure drop (DP) when variable orifice 76 is operating properly and responding to instructions from controller 78. However, line B represents flow rate vs. pressure drop (DP) in the event that variable orifice 76 is not operating properly or is not responding to instructions from controller 78. It should be understood that the values provided in FIG. 4 are representative of an embodiment, and other values may be used with the systems of the present disclosure.

When extendable rod 52 is extended, fluid flows from control valve 62 through fluid line 64, through first fixed orifice 82 (shown as D in FIG. 4), through variable orifice 76 (shown as C in FIG. 4), and through second fixed orifice 88 (shown as F in FIG. 4) to cylinder 50, then to fluid line 68 and back to control valve 62. Once fluid pressure reaches a desired pressure, the fluid will overcome biasing pressure of second check valve 90 and also flow through second check valve 90 (shown as E in FIG. 4). First check valve 84 forces fluid to flow through first fixed orifice 82 when extendable rod 52 is extending.

Conversely, when extendable rod 52 is retracted, fluid flows from control valve 62 through fluid line 68, through cylinder 50, through second fixed orifice 88 (shown as F in FIG. 4), through variable orifice 76 (shown as C in FIG. 4), and through first fixed orifice 82 (shown as D in FIG. 4), then to fluid line 64 and back to control valve 62. Once fluid pressure reaches a desired pressure, the fluid will overcome biasing pressure of first check valve 84 and will also flow through first check valve 84 (shown as G in FIG. 4). Second check valve 90 forces fluid to flow through second fixed orifice 88 when extendable rod 52 is retracting.

Thus, flow rates for extension and retraction of extendible rod 52 may be individually tuned even when variable orifice 76 is not active or is not responsive to communication signals from controller 78.

It should be understood that the above description is intended for illustrative purposes only. In particular, it should be appreciated that all methods described herein can be performed in any suitable order unless otherwise indicated herein or otherwise clearly contradicted by context.

While aspects of the present disclosure have been particularly shown and described with reference to the embodiments above, it will be understood by those skilled in the art that various additional embodiments may be contemplated by modification of the disclosed machines, systems and methods without departing from the spirit and scope of what is disclosed. Such embodiments should be understood to fall within the scope of the present invention as determined based upon the claims below and any equivalents thereof.

What is claimed is:

1. A tractor-scraper machine comprising:
   a tractor drive vehicle having a propulsion system and a hydraulic fluid pump;
   a towed scraper; and
   a cushion hitch that couples the towed scraper to the tractor drive vehicle, the cushion hitch including;
      first and second pivotable links coupled between the towed scraper and the tractor drive vehicle; and
      a suspension system, the suspension system having;
         a hydraulic cylinder with an extendable rod, the hydraulic cylinder and the rod coupled between the first and second pivotable links;
         a control valve fluidly coupled between the hydraulic cylinder and the fluid pump, the control valve configured to adjust an extension length of the rod;
         a variable orifice fluidly coupled between the hydraulic cylinder and the control valve, the variable orifice configured to adjust resistance to extension and retraction of the rod;
         a first fixed restrictive element fluidly coupled in series with the variable orifice to dissipate energy as the rod extends; and
         a second fixed restrictive element fluidly coupled in series with the variable orifice to dissipate energy as the rod retracts.

2. The tractor-scraper machine of claim 1, wherein the first and second pivotable links each include a pivot at a drive vehicle end and at towed scraper end.

3. The tractor-scraper machine of claim 2, wherein the hydraulic cylinder is coupled to the drive vehicle end of the first pivotable link and the rod is coupled to the scraper trailer end of the second pivotable link.

4. The tractor-scraper machine of claim 1, further comprising an accumulator fluidly coupled to the control valve and situated to communicate fluid with the hydraulic cylinder.

5. The tractor-scraper machine of claim 1, wherein the towed scraper includes a second propulsion system that provides driving power to wheels of the towed scraper.

6. The tractor-scraper machine of claim 1, wherein the first and second links attach between the towed scraper and the tractor drive vehicle in non-parallel planes.

* * * * *